Jan. 5, 1971 C. D. DIPNER 3,552,994
PRESSURE SENSITIVE ADHESIVE SHEET
Filed March 2, 1967

INVENTOR
CHARLES DIPNER
BY
Nicholas A. Gallo, III
ATTORNEY

United States Patent Office 3,552,994
Patented Jan. 5, 1971

3,552,994
PRESSURE SENSITIVE ADHESIVE SHEET
Charles D. Dipner, Cranford, N.J., assignor to Johnson &
Johnson, a corporation of New Jersey
Filed Mar. 2, 1967, Ser. No. 619,981
Int. Cl. A61l *15/06;* C09j *7/04*
U.S. Cl. 117—68.5                                       4 Claims

ABSTRACT OF THE DISCLOSURE

Tape constructions are disclosed in which in contrast to conventional practice, a primer for the adhesive is disposed on the opposite side of the tape backing from the adhesive, the adhesive being anchored to the primer through openings provided in the backing substrate. Thus, the primer need only adhere tenaciously to the adhesive and need not adhere to the backing substrate, thus eliminating complex primer formulation problems normally encountered. Since the primer is interposed on the outer surface of the tape backing, it may provide a base for other coatings and, when utilizing fibrous substrates, significant advantages in flexibility and conformability of the resulting tape are obtained by virtue of the elimination of the direct bond conventionally provided between these coatings and the substrate.

THE INVENTION

The tape constructions provided according to this invention comprise: (1) a substrate containing a multiplicity of spaced openings, (2) a pressure sensitive adhesive coating on one surface of the substrate and overlying the openings, and (3) an effective primer coating on the opposite surface of the substrate and also overlying the openings, the adhesive and primer adhering tenaciously to each other through the openings in the substrate and thus sandwiching the substrate therebetween, the surface of the tape opposite the adhesive being a release surface for the adhesive.

THE INVENTION AS A SOLUTION FOR VARIOUS PRIOR ART PROBLEMS

(A) Primer formulation

In the manufacture of pressure sensitive adhesive sheets, the normally tacky pressure sensitive adhesive coating must be firmly anchored to the backing substrate so that the adhesive mass does not tend to delaminate from the backing when the sheet is exposed to sheering forces during use. These forces may be encountered when the sheet, if provided wound on itself in roll form, is unwound for use or when the sheet is removed from a surface to which it has been adhered.

Depending on the particular choice of backing and adhesive, the adhesive mass may, in fact, adhere tenaciously directly to the backing. However, more often than not, this is not the case and the natural adhesion of the mass to the backing is not sufficient to eliminate delamination of the adhesive from the backing during use of the tape. In order to improve the bond between the adhesive and the backing, it has been the normal practice to apply a primer for the adhesive to the surface of the backing to which the adhesive is applied. The primer chosen adheres much more tenaciously to the backing than would the adhesive, and in addition, forms a strong bond with the adhesive. Thus, overall, the bond between the adhesive and the backing substrate is improved.

Formulating substances which have the duel adhesion properties required by primers is often an expensive and lengthy matter and it was, therefore, one object of this invention to provide a tape construction in which the "primer" (i.e., broadly, a material which in effect increases the adhesion between the adhesive and the backing substrate) need only adhere tenaciously to the adhesive and need not be chosen or formulated to also adhere strongly to the backing substrate.

Since the tape constructions of this invention depend for structural integrity on the bond between the adhesive and primer through the substrate interstices, both the adhesive and the primer may have a greater affinity for each other than the primer has for the substrate, and the primer may in fact have little or no affinity for the backing substrate. Thus, conventional complex primer formulation may be avoided.

(B) Flexibility and deformability of tapes

In a pressure sensitive adhesive tape, in addition to adhering tenaciously to one surface of the backing, the adhesive must have a greater affinity for that one surface of the backing than it has for the surface of the tape opposite the adhesive; otherwise, when the sheet is wound on itself in roll form with the adhesive mass facing inward toward the axis of the roll, it will be virtually impossible to unwind the tape for use without delamination of the adhesive from the backing or shredding of the tape. One method of providing this "preferential adhesion" of the adhesive to one surface of the backing is to use a primer as described above. However, in many cases, the use of a primer does not provide sufficient differential adhesion and therefore a "release coating" is applied to the surface of the backing substrate opposite the adhesive, the release coating adhering strongly to the backing substrate but, conversely of the primer, having little or no affinity for the adhesive. In designing special tapes, other treatments or coatings have been applied to the surface of the backing opposite the adhesive. Thus, for example, a waterproof coating such as polyethylene is sometimes applied when providing tapes for hospital use.

For many uses, especially medical uses, conformability of pressure sensitive adhesive tapes to body contours and deformability of the tapes under stress is essential or at least highly desirable. Optimumly, such tapes would utilize strong but flexible and deformable substrates, particularly woven fibrous substrates. In the case of fibrous backing substrates, however, if the release coating or other outer coating are firmly and rigidly adhered directly to the fibrous substrate, the substrate, and thus the tape, loses much of its freedom of movement. The fibers and yarns in the substrate are relatively inextensible and the bonding of the release coating to the substrate bonds together the individual fibers or yarns, thus reducing their ability to move relative to each other.

According to this invention, tapes may be provided in which any release coatings, waterproof coatings, or other outer coatings desired may be applied to the exposed surface of the primer or may actually double as the primer, and therefore if the primer is anchored to the backing substrate primarily through its bond to the adhesive through openings in the substrate, the bonding of these coatings directly to the fibers in the substrate is eliminated.

The invention will now be described with greater particularity making reference to the attached drawings. In the drawings, FIG. 1 is a view in perspective of a roll of the pressure sensitive tape of this invention;

Figure 1:
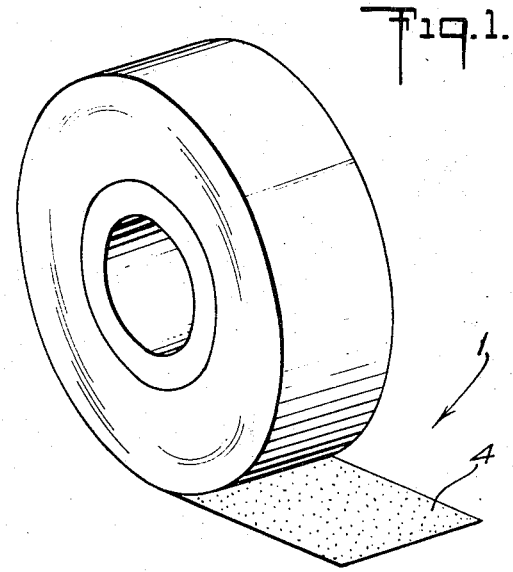
Figure 2:
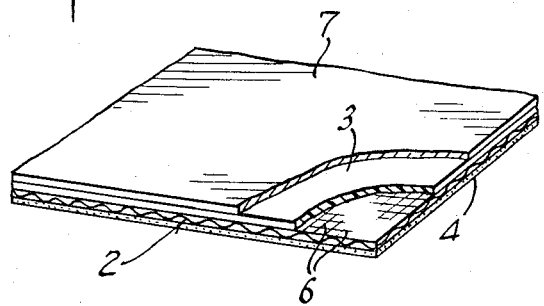
FIG. 2 is a view in perspective of a segment of the tape of FIG. 1.
Figure 3:
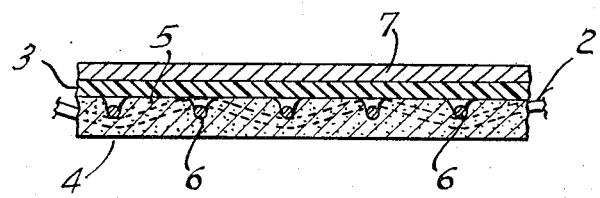
FIG. 3 is an enlarged cross section of the tape segment of FIG. 2.

Referring now specifically to the drawings, there is illustrated a pressure sensitive adhesive tape, 1, having a bleached 44 x 36 open mesh cotton gauze substrate, 2. The effective priming layer 3 on one side of the substrate 2 and overlying openings 5 is a polar ethylene copolymer (ethylene-vinyl acetate copolymer) and the adhesive coating, 4, on the opposite side of substrate 2 and also overlying openings 5 is a conventional polyisoprene based adhesive. In completing the tape construction, a polyethylene homopolymer waterproof release coating 7 is applied to the outer surface of the ethylene copolymer 3.

The ethylene copolymer coating 3 has a low degree of adhesion for the open mesh gauze 2, however, the copolymer and the adhesive adhere tenaciously to each other through the interstices 5 of the fibrous substrate. Thus, the individual threads 6 of the gauze, 2, have a relatively high degree of freedom to move relative to each other and thus the tape has a high degree of flexibility and conformability. The copolymer is also impervious to water and therefore doubles as a waterproofing coating. If for some reason, it is desired that the primer layer adhere directly to the substrate as well as to each other, this may be accomplished by interposing primers in the conventional sense between that layer and the substrate.

COMPONENTS OF TAPES OF THIS INVENTION

(A) Substrate

The substrate may be any open mesh or open woven material; however, fibrous substrates are most useful in the practice of the invention since the former have presented the most difficult problems with respect to tape flexibility and conformability and the latter have presented the most difficult problems with respect to primer formulation. Any open structure such as the gauze structure described above and illustrated in the drawings is satisfactory as long as the openings in the substrate are large enough for the adhesive to penetrate through the same and contact and adhere to the primer.

(B) Adhesive

The pressure sensitive adhesive may be any pressure sensitive adhesive which adheres tenaciously to the primer. Thus, the choice of primer and adhesive are somewhat related. Since rubber based adhesives such as those disclosed in Korpman Pat. 2,999,769 are often desired for use in tapes for medical applications and since these adhesives do not generally adhere well enough to either fibrous substrates, and thus require some sort of primer, the rubber based adhesives will most often be used in their invention.

(C) "Primer"

The primer likewise may be any material which adheres, either treated or untreated, tenaciously to the pressure sensitive adhesive mass and preferably does not adhere tenaciously to the backing substrate. Thus, the primer may conveniently be a polar polyethylene or a polar olefin copolymer, such as ethylene vinyl acetate copolymers and ethylene ethyl acrylate copolymers. Coatings of these copolymers can easily be formed by extrusion on a fibrous substrate in such a manner that the coating does not adhere tenaciously to the fibrous substrate. On the other hand, these copolymers can be made to adhere tenaciously to rubber based pressure sensitive adhesives. If coatings or films of the primer adhere tenaciously to the adhesive without further treatment, such as is the case with polar polyolefin copolymers and rubber based adhesives, it will be necessary to treat or coat the outer surface of the primer to retard this adherence so that when the tape is wound on itself in the form of a roll, the same may be readily unwound for use.

In the preferred practice of the invention, the commercially available polar, ethylene vinyl acetate copolymers which are used include Alathon 3185 (33% vinyl acetate, density 0.95, melt index 25, Vicat softening temperature 120° F., stiffness 1200 p.s.i.), Alathon 3180 (28% vinyl acetate, density 0.95, melt index 15, Vicat softening temperature 120° F., stiffness 1550 p.s.i.), Alathon 3175 (28% vivnyl accetate, density 0.95, melt index 6, Vicat softening temperature 127° F., stiffness 1770 p.s.i.), Alathon 3190 (25% vinyl acetate, melt index 2, stiffness 3100 p.s.i.), Alathon 3170 (18% vinyl accetate, density 0.94, melt index 2.5, Vicat softening temperature 138° F., stiffness 4400 p.s.i.), all commercially sold by Du Pont, as well as DQDA 3269 (28.5% vinyl acetate, density 0.95, melt index 20) sold commercially by Union Carbide. Suitable commercially available copolymers of ethylene and ethyl acrylate include, for example, DPD 6169 (18–20% ethyl acrylate, density 0.93, melt index 6, Vicat softening temperature 153° F., stiffness 4500 p.s.i.) sold by Union Carbide.

Other advantages are provided when the invention is used specifically in conjunction with fibrous substrates and polar olefin copolymers. The bond between most adhesives and fibrous backings is generally quite susceptible to weakening in the presence of moisture. Thus, if the tape is to be used on the skin of a patient, perspiration, bathing, and other wetting of the same may cause the bond between the primed adhesive and the fibrous backing to lose much of its strength and thus the adhesive will tend to delaminate from the backing and transfer to the skin of the patient. However, in the tapes of this invention, the bond between a polar olefin copolymer primer layer and a rubber based adhesive through the substrate openings is highly resistant to moisture.

The particular manner of manufacturing the tape is not part of the present invention and any method of manufacture may be used as long as in the finished tape the adhesive adheres tenaciously to the primer layer through the openings in the backing substrate. However, when utilizing rubber based adhesives and a polar ethylene copolymer primer, it is advantageous to intimately press the copolymer and the adhesive together at elevated temperatures so that the rubber based adhesive and the copolymer rapidly form an extremely strong bond. This is suitably carried out by extruding the copolymer onto the fibrous substrate and then applying adhesive to the opposite surface of the substrate by calendering.

A SPECIFIC EXAMPLE OF THE INVENTION

A tape is prepared by extrusion coating 80 x 56 mesh broadcloth with 1.25 mils of ethylene-vinyl acetate copolymer (Alathon 3180, previously described) at a speed of 220 feet per minute at a resin extrusion die melt temperature of 470° F. The copolymer coating is then overcoated by extrusion with 0.75 mil of a polyethylene homopolymer at a speed of 350 feet per minute while the resin is extruded at a die melt temperature of 555° F. The exposed surface of the broadcloth substrate is then calender coated with 5 ounces per square yard of the polyisoprene based pressure sensitive adhesive mass described earlier utilizing a two-roll calender in which the top roll is heated to 250° F. and the bottom roll is heated to 160° F., the backing being passed through the calender at a speed of 12 yards per minute with the coated side of the cloth contacting the bottom roll. The adhesive is heated at 250° F. on a two-roll mill before it is placed on the uncoated side of the cloth. The tape drum is slit into one inch wide rolls and aged for 2 days at room temperature.

In order to make comparative tests, strips of the same substrate are coated on one side with the copolymer, but no adhesive is applied to the opposite side of the substrate. The cloth backing containing the copolymer coating on one side but containing no adhesive coating on the opposite side is tested for the adhesion between the copolymer and the substrate. Strips of conventional pressure sensitive tape 1" x 12" in size are adhered to the outer surface of the copolymer coating of the test sample. It is attempted to separate the conventional tape from the coating at a speed of 12 inches per minute and it is found that instead of the conventional adhesive tape separating from the copolymer coating of the test sample, the copolymer coating separates from the fibrous substrate at a force of 0.4 pound per inch width. Thus, it is found that the copolymer coating has very low adhesion to the fibrous substrate.

Rolls of the tapes of this invention made as described above are unwound at a speed of 30 feet per minute, the unwind tension of the tapes being 2.9 pounds per inch width. During unwinding, the copolymer coating does not separate from the fibrous substrate and thus the coatings which were formerly at best lightly bonded to the cloth substrate prior to application of pressure sensitive adhesive combine with the adhesive to resist an unwind force of at least 2.9 pounds per inch. Thus, it is evident that the pressure sensitive adhesive contacts the copolymer coating through the interstices of the fibrous substrate and developed a high degree of adhesion to the copolymer coating.

The tapes produced as described above are tested on the arms of patients and are found to be highly flexible and readily conformable to the limb. When the patient thoroughly wets the tapes during bathing, it is found that when the tapes are again tested for adhesion of the mass to backing, the bond between the primer and the adhesive is virtually unaffected.

Although specific embodiments of the invention have been presented, they have only been presented to better describe the inventive concept and should not be construed to limit the invention. The invention is only limited by the scope of the following claims.

What is claimed is:

1. A normally tacky pressure sensitive adhesive tape comprising a woven fabric substrate having interstices therein which form a series of openings, a normally tacky pressure sensitive rubber base adhesive coating on one surface of said substrate and extending across and into said openings, and a primer coating on the opposite surface of and lightly bonded to said substrate and extending across said openings, said openings being sufficiently large that said adhesive on one surface of the fabric substrate contacts said primer coating therethrough, said primer being a copolymer from the group consisting of ethylene vinyl acetate copolymer and ethylene ethyl acrylate copolymer, said pressure sensitive adhesive and said primer adhering tenaciously to each other substantially solely through the interstices of said substrate, and a coating on the outer surface of said primer coating of a material having low order of adhesion with respect to said rubber base pressure sensitive adhesive.

2. The pressure sensitive adhesive tape of claim 1 in which said adhesive and said primer have a greater affinity for each other than either said primer or said adhesive has for said substrate.

3. The pressure sensitive adhesive tape of claim 1 in which said primer coating is impervious to water and thus imparts waterproof properties to said tape.

4. An adhesive tape of claim 1 in which said coating on the outer surface of said primer is polyethylene.

References Cited
UNITED STATES PATENTS

| | | | |
|---|---|---|---|
| 2,229,316 | 1/1941 | Van Cleef | 117—122UX |
| 2,253,922 | 8/1941 | Van Cleef | 117—122UX |
| 2,356,354 | 8/1944 | Rodman | 117—68.5 |
| 2,882,183 | 8/1959 | Bond et al. | 117—122X |
| 2,887,403 | 5/1959 | Wolff | 117—68.5 |
| 3,066,043 | 11/1962 | Hechtman et al. | 117—68.5 |
| 3,181,765 | 5/1965 | Bonzagni et al. | 117—161UX |
| 3,256,228 | 6/1966 | Tyran | 117—161X |
| 3,424,607 | 1/1969 | Coscia | 117—5.3X |

WILLIAM D. MARTIN, Primary Examiner

H. J. GWINNELL, Assistant Examiner

U.S. Cl. X.R.

117—76, 122